(12) United States Patent
Ohtsuka

(10) Patent No.: US 12,725,995 B2
(45) Date of Patent: Sep. 1, 2026

(54) OPTICAL FIBER AMPLIFIER AND RARE-EARTH ELEMENT DOPED MULTICORE OPTICAL FIBER

(71) Applicant: SUMITOMO ELECTRIC INDUSTRIES, LTD., Osaka (JP)

(72) Inventor: Takafumi Ohtsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 374 days.

(21) Appl. No.: 18/608,073

(22) Filed: Mar. 18, 2024

(65) Prior Publication Data

US 2024/0322516 A1 Sep. 26, 2024

(30) Foreign Application Priority Data

Mar. 23, 2023 (JP) ................................ 2023-047138

(51) Int. Cl.
*H01S 3/067* (2006.01)
*H01S 3/23* (2006.01)

(52) U.S. Cl.
CPC ...... *H01S 3/06716* (2013.01); *H01S 3/06737* (2013.01); *H01S 3/2316* (2013.01)

(58) Field of Classification Search
CPC ............ H01S 3/06716; H01S 3/06737; H01S 3/2316; H01S 3/06754; H01S 3/06758; H01S 3/09415; H01S 3/1608; H01S 3/1603
See application file for complete search history.

(56) References Cited

U.S. PATENT DOCUMENTS 6,288,835 B1 9/2001 Nilsson et al.
2023/0003934 A1* 1/2023 Takasaka ........... G02B 6/02042

OTHER PUBLICATIONS

H. T. Bookey et al., "Three-core tellurite fiber with multiple rare earth emission," 2008 Conference on Lasers and Electro-Optics and 2008 Conference on Quantum Electronics and Laser Science, San Jose, CA, USA, 2008, pp. 1-2, (Year: 2008).*
S. Takasaka et al., "EDF Length Dependence of Amplification Characteristics of Cladding Pumped 19-Core EDFA", 2018 Optical Fiber Communications Conference and Exposition (OFC), San Diego, CA, USA, 2018, pp. 1-3.

(Continued)

*Primary Examiner* — Matthew Mikels
(74) *Attorney, Agent, or Firm* — IPUSA, PLLC

(57) ABSTRACT

An optical fiber amplifier includes a first rare-earth element doped optical fiber including a first region including a center of a first core configured to guide signal light, a second region surrounding the first region and doped with a rare-earth element, and a third region surrounding the second region. The optical fiber amplifier includes a second rare-earth element doped optical fiber provided on a signal output-side of the first rare-earth element doped optical fiber, the second rare-earth element doped optical fiber including a fourth region including a center of a second core configured to guide the signal light, and the fourth region being doped with the rare-earth element. The second rare-earth element doped optical fiber includes a fifth region surrounding the fourth region, and includes a sixth region surrounding the fifth region.

12 Claims, 12 Drawing Sheets

(56) References Cited

OTHER PUBLICATIONS

M. Wada et al., "Full C-band and Power Efficient Coupled-multi-core Fiber Amplifier", 2020 Optical Fiber Communications Conference and Exhibition (OFC), San Diego, CA, USA, 2020, pp. 1-3.
S. LaRochelle et al., "Cladding-pumped multicore amplifiers with ring doping", 2021 Optical Fiber Communications Conference and Exhibition (OFC), San Francisco, CA, USA, 2021, pp. 1-3.

* cited by examiner

OPTICAL FIBER AMPLIFIER AND RARE-EARTH ELEMENT DOPED MULTICORE OPTICAL FIBER

CROSS-REFERENCE TO RELATED APPLICATIONS

This application claims priority of Japanese Patent Application No. 2023-47138, filed on Mar. 23, 2023, the entire contents of which are incorporated herein by reference.

TECHNICAL FIELD

The present disclosure relates to an optical fiber amplifier and a rare-earth element doped multicore optical fiber.

BACKGROUND

Each of Non-Patent Document 1 and Non-Patent Document 2 describes a method of increasing density of a core surrounded by a first cladding that confines pump light, in order to reduce optical pump power for each core in a multicore optical fiber amplifier with a cladding pumped configuration.

Each of Patent Document 1 and Non-Patent Document 3 discloses a rare-earth doped multicore optical fiber amplifier in which a ring region is doped with rare-earth in a rare-earth doped optical fiber.

PRIOR ART DOCUMENT

Patent Document

[Patent Document 1] U.S. Pat. No. 6,288,835

Non-Patent Document

[Non-Patent Document 1] S. Takasaka et al., "EDF Length Dependence of Amplification Characteristics of Cladding Pumped 19-Core EDFA", 2018 Optical Fiber Communications Conference and Exposition (OFC), San Diego, CA, USA, 2018, pp. 1-3.

[Non-Patent Document 2] M. Wada, T. Sakamoto, S. Aozasa, R. Imada, T. Yamamoto and K. Nakajima, "Full C-Band and Power Efficient Coupled-Multi-Core Fiber Amplifier", 2020 Optical Fiber Communications Conference and Exhibition (OFC), San Diego, CA, USA, 2020, pp. 1-3.

[Non-Patent Document 3] S. LaRochelle, C. Matte-Breton, C. Kelly and R. J. Essiambre, "Cladding-pumped multicore amplifiers with ring doping", 2021 Optical Fiber Communications Conference and Exhibition (OFC), San Francisco, CA, USA, 2021, pp. 1-3.

SUMMARY

An optical fiber amplifier in the present disclosure includes a first rare-earth element doped optical fiber including a first region including a center of a first core configured to guide signal light, a second region surrounding the first region and doped with a rare-earth element, and a third region surrounding the second region. The optical fiber amplifier includes a second rare-earth element doped optical fiber provided on a signal output-side of the first rare-earth element doped element optical fiber, the second rare-earth element doped optical fiber including a fourth region including a center of a second core configured to guide the signal light, and the fourth region being doped with the rare-earth element. The second rare-earth element doped optical fiber includes a fifth region surrounding the fourth region and a sixth region surrounding the fifth region.

DETAILED DESCRIPTION

Figure 1:
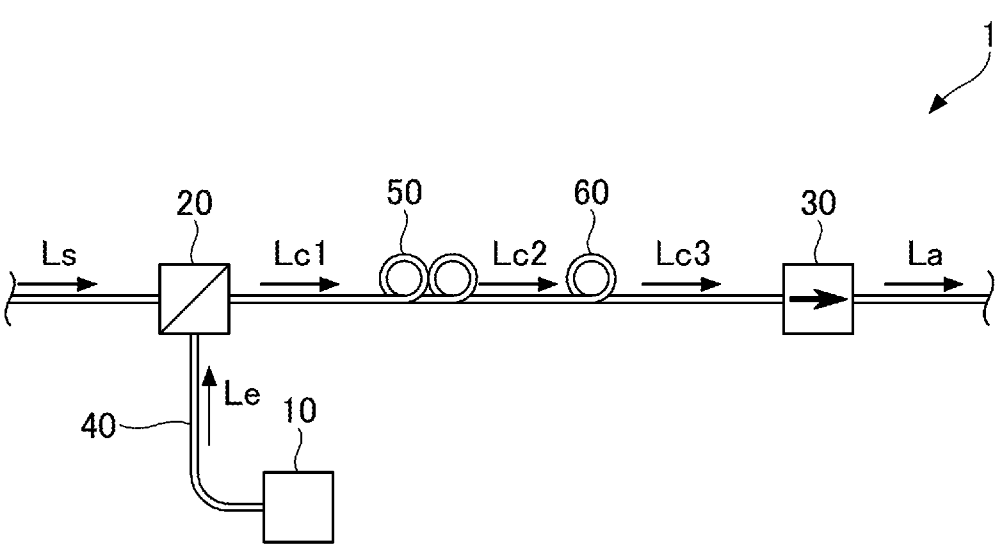
FIG. 1 is a diagram showing the outline of an optical fiber amplifier according to a first embodiment.

Problem to be Solved by the Present Disclosure

In optical fiber amplifiers, it is required to increase power efficiency and reduce noise figure.

The present disclosure provides an optical fiber amplifier with higher power efficiency and lower noise figure.

Effects of the Present Disclosure

In the present disclosure, power efficiency can be increased and noise figure can be reduced.

Description of Embodiments in the Present Disclosure

First, embodiments of the present disclosure will be listed and described as follows.

(1) An optical fiber amplifier in the present disclosure includes a first rare-earth element doped optical fiber and a second rare-earth element doped optical fiber. The first rare-earth element doped optical fiber includes a first region including a center of a first core configured to guide signal light, a second region surrounding the first region, and a third region surrounding the second region. The second region is doped with a rare-earth element. The second rare-earth element doped optical fiber is provided on a signal output-side of the first rare-earth element doped optical fiber. The second rare-earth element doped optical fiber includes a fourth region including a center of a second core configured to guide the signal light, a fifth region surrounding the fourth region, and a sixth region surrounding the fifth region. The fourth region is doped with the rare-earth element.

In the optical fiber amplifier of the present disclosure, after signal light is amplified by a first rare-earth element doped optical fiber, the signal light is further amplified by a second rare-earth element doped optical fiber. With this arrangement, power efficiency can be increased and noise figure can be reduced.

(2) In (1) above, in a first rare-earth element doped optical fiber, a concentration of a rare-earth element in a first region may be less than or equal to a concentration of the rare-earth element in a second region. With this arrangement, the influence of the first region can be suppressed when the optical fiber amplifier amplifies signal light.

(3) In (1) or (2) above, in a first rare-earth element doped optical fiber, a concentration of a rare-earth element in a first region may be 10% or less a concentration of the rare-earth element in a second region. With this arrangement, the influence of the first region can be suppressed when an optical fiber amplifier amplifies signal light.

(4) In any one of (1) to (3) above, in a second rare-earth element doped optical fiber, a concentration of a rare-earth element in a fourth region may be less than or equal to a concentration of the rare-earth element in a fifth region. With this arrangement, the influence of the fifth region can be suppressed when an optical fiber amplifier amplifies signal light.

(5) In any one of (1) to (4) above, in a second rare-earth element doped optical fiber, a concentration of a rare-earth element in a fifth region may be 10% or less a concentration of the rare-earth element in a fourth region. With this arrangement, the influence of a fifth region can be suppressed when the optical fiber amplifier amplifies signal light.

(6) In any one of (1) to (5) above, a first region in a first rare-earth element doped optical fiber may be a circular region centered around a center of a first core included in a first region. Also, a fourth region of a second rare-earth element doped optical fiber may be a circular region centered around a center of a second core included in a fourth region. Further, a diameter of the first region may be greater than a diameter of the fourth region. With this arrangement, when an optical fiber amplifier amplifies signal light, light can be amplified in respective different regions in the first rare-earth element doped optical fiber and the second rare-earth element doped optical fiber.

(7) In any one of (1) to (6) above, each of a first rare-earth element doped optical fiber and a second rare-earth element doped optical fiber may satisfy a single mode condition in which signal light is transmitted in single mode at an operational wavelength. When the single mode condition is satisfied at the operational wavelength, an optical fiber amplifier can be used in long haul optical communications.

(8) In any one of (1) to (7) above, a first rare-earth element doped optical fiber has a first mode field diameter at an operational wavelength, a second rare-earth element doped optical fiber has a second mode field diameter at an operational wavelength, and the first mode field diameter and the second mode field diameter may be matched within a relative error range of 15% or less. When the first mode field diameter and the second mode field diameter are matched within the relative error range of 15% or less, splice loss can be reduced.

(9) In any one of (1) to (8) above, each of a first rare-earth element doped optical fiber and a second rare-earth element doped optical fiber may be a multicore optical fiber. When each of the first rare-earth element doped optical fiber and the second rare-earth element doped optical fiber is the multicore optical fiber, an optical fiber amplifier can amplify light that is received from the multicore optical fiber.

(10) A rare-earth element doped multicore optical fiber in the present disclosure includes multiple cores each of which is configured to guide signal light, each core of the multiple cores including a first region including a center of the core, and a second region surrounding the first region. Also, the rare-earth element doped multicore optical fiber in the present disclosure includes a third region surrounding all second regions. Further, in the rare-earth element doped multicore optical fiber in the present disclosure, a concentration of a rare-earth element in the first region is less than a concentration of the rare-earth element in the second region.

In the rare-earth element doped multicore optical fiber of the present disclosure, power efficiency can be increased and noise figure can be reduced.

(11) In (10) above, in a rare-earth element doped multicore optical fiber, a concentration of a rare-earth element in a first region may be 20% or less a concentration of the rare-earth element in a second region. When the concentration of the rare-earth element in the first region is 20% or less the concentration of the rare-earth element in the second region, the influence of the first region can be suppressed.

(12) In (9) above, a first rare-earth element doped optical fiber may be a rare-earth element doped multicore optical fiber described in (10) or (11) above.

In an optical fiber amplifier disclosed in (12) above, power efficiency can be increased and noise figure can be reduced.

Details of Embodiments of the Present Disclosure

Specific examples of an optical fiber amplifier of the present disclosure will be described below with reference to the drawings. The present disclosure is not limited to these examples. Various modifications, omissions, substitutions, and changes in the embodiments are intended to cover the scope of and the equivalent to the present disclosure.

In embodiments in the specification and the drawings, components having substantially the same or corresponding functions are denoted by the same numerals, and redundant description may be omitted. In addition, for ease of understanding, the scale of each component in the drawings may be different from an actual scale.

The embodiments will be described as follows. At least any portion of one or more embodiments described below may be combined with any other embodiment.

First Embodiment

An optical fiber amplifier according to a first embodiment will be described below. The optical fiber amplifier according to the first embodiment includes a first rare-earth element doped optical fiber and a second rare-earth element doped optical fiber that is provided on a signal output-side of the first rare-earth element doped optical fiber. In the optical fiber amplifier according to the first embodiment, the concentration distribution of a rare-earth element in a cross-section perpendicular to a longitudinal direction of the second rare-earth element doped optical fiber is different from the concentration distribution of the rare-earth element in a cross-section perpendicular to a longitudinal direction of the first rare-earth element doped optical fiber. In the optical fiber amplifier according to the first embodiment, a single-core optical fiber is used for each of the first rare-earth element doped optical fiber and the second rare-earth element doped optical fiber. For example, when the optical fiber amplifier is used in long haul optical communications, each of the first rare-earth element doped optical fiber and the second rare-earth element doped optical fiber may satisfy a single mode condition in which signal light is transmitted in single mode at an operation wavelength.

The optical fiber amplifier according to the first embodiment will be described below using a specific example. FIG. 1 is a diagram schematically showing an optical fiber amplifier 1 as an example of the optical fiber amplifier according to the first embodiment. In the optical fiber amplifier 1, an erbium doped optical fiber (EDF) in which an optical fiber is doped with erbium (Er) is used as each of the first rare-earth element doped optical fiber and the second rare-earth element doped optical fiber.

The optical fiber amplifier 1 amplifies signal light Ls, and outputs the amplified signal light Ls as signal light La. The optical fiber amplifier 1 includes a pump light source 10, an optical combiner 20, an optical isolator 30, an EDF 50, and an EDF 60. The EDF 50 and the EDF 60 are provided between the optical combiner 20 and the optical isolator 30. The EDF 60 is provided on an output side of the EDF 50.

A mode field diameter of the EDF 50 at an operational wavelength and a mode field diameter of the EDF 60 at an operational wavelength are matched within a relative error range of 15% or less. When the mode field diameter of the EDF 50 at the operational wavelength and the mode field diameter of the EDF 60 at the operational wavelength are matched within the relative error range of 15% or less, splice loss can be suppressed to 0.1 dB or less.

The signal light Ls to be amplified by the optical fiber amplifier 1 is input to the optical combiner 20. The pump light source 10 is connected to the optical combiner 20 via a pump delivery fiber 40. Pump light Le that is output from the pump light source 10 is combined with the signal light Ls in the optical combiner 20. The optical combiner 20 outputs combined light Lc1 that is obtained by combining the signal light Ls and the pump light Le, to the EDF 50. The EDF 50 amplifies the signal light Ls that is included in the input combined light Lc1. Then, the EDF 50 outputs combined light Lc2 to the EDF 60. The EDF 60 amplifies the signal light Ls included in the input combined light Lc2. The EDF 60 outputs combined light Lc3 to the optical isolator 30. The combined light Lc3 that passes through the optical isolator 30 is output as signal light La.

Hereinafter, the first rare-earth element doped optical fiber in the optical fiber amplifier according to the first embodiment will be described.

The first rare-earth element doped optical fiber includes a first region with a center of a core for guiding the signal light, a second region that surrounds the first region, and a third region that surrounds the second region. In the first rare-earth element doped optical fiber, the second region is doped with a rare-earth element. Both the first region and the second region may be doped with the rare-earth element.

Figure 2:
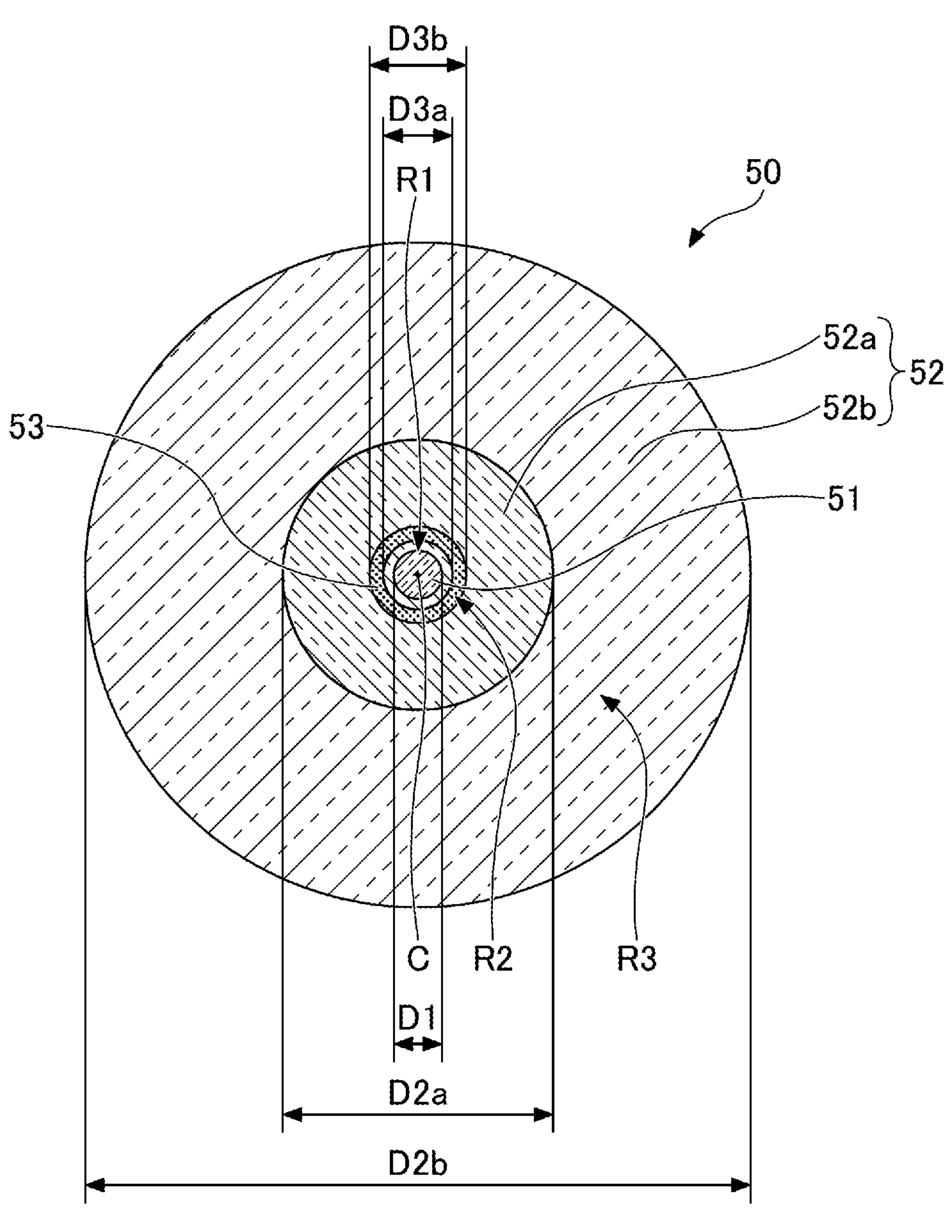
FIG. 2 is a cross-sectional view of a schematic structure of a first rare-earth element doped optical fiber in the optical fiber amplifier according to the first embodiment.

The first rare-earth element doped optical fiber in the optical fiber amplifier according to the first embodiment will be described below using a specific example. FIG. 2 is a diagram showing a schematic structure of the EDF 50 in the optical fiber amplifier 1 as an example of the optical fiber amplifier according to the first embodiment. FIG. 2 is a cross-sectional view of the EDF 50 taken along a plane perpendicular to a longitudinal direction of the EDF 50.

The EDF 50 includes a core 51 and a cladding 52. The cladding 52 includes a first cladding 52*a* and a second cladding 52*b*. The EDF 50 has a waveguide structure that is used for the signal light Ls and is constituted by the core 51 and the first cladding 52*a*. The EDF 50 also has a waveguide structure that is used for the pump light Le and is constituted by the first cladding 52*a* and the second cladding 52*b*. In the EDF 50, an annular region of the first cladding 52*a*, defined by two concentric circles whose centers coincide with the center of the core 51, is doped with erbium. In FIG. 2, an erbium doped region 53 in which the annular region is doped with erbium is indicated by a dotted pattern.

An EDF including an annular region doped with erbium, such as the EDF 50, may be referred to as an optical fiber with an erbium doped annular region.

The core 51 is formed of silica glass co-doped with germanium and aluminum. In the core 51, by co-doping the silica glass with germanium and aluminum, a refractive index of the core 51 is 0.9% greater than that of pure silica glass. A diameter D1 of the core 51 is, for example, 8.9 μm.

The first cladding 52*a* is formed of silica glass doped with aluminum. In the first cladding 52*a*, by doping the silica glass with aluminum, a refraction index of the first cladding 52*a* is 0.5% greater than that of pure silica glass. A diameter D2*a* of the first cladding 52*a* is, for example, 50 μm.

The second cladding 52*b* is formed of silica glass doped with fluorine. In the second cladding 52*b*, by doping the silica glass with fluorine, a refraction index of the second cladding 52*b* is 0.7% less than that of pure silica glass. A diameter D2*b* of the second cladding 52*b* is, for example, 125 μm.

An inner diameter D3*a* of the erbium doped region 53 in which the first cladding 52*a* is doped with erbium is, for example, 14.2 μm. An outer diameter D3*b* of the erbium doped region 53 is, for example, 17.7 μm. In the erbium doped region 53, the first cladding 52*a* is doped with erbium having an atomic concentration of about $5\times10^{24}$ $m^{-3}$.

When the diameter D1 of the core 51 is used as a reference, the inner diameter D3*a* of the erbium doped region 53 is greater than or equal to 0.4×D1 and less than or equal to 1.8×D1, preferably greater than or equal to 0.8×D1 and less than or equal to 1.4×D1. When the diameter D1 of the core 51 is used as the reference, the outer diameter D3*b* of the erbium doped region 53 is greater than or equal to 0.8×D1 and less than or equal to 3.0×D1, preferably greater than or equal to 1.0×D1 and less than or equal to 2.0×D1.

In the EDF 50, an inward region from the inner diameter of the erbium doped region 53, which is annular, is referred to as a first region R1. The erbium doped region 53 is referred to as a second region R2. Further, a region that is outward from the outer circumference of the annular erbium doped region 53 is referred to as a third region R3.

In the above example, the second region R2 is doped with the rare-earth element, but both the first region R1 and the second region R2 may be doped with the rare-earth element. For example, a concentration of erbium, which is the rare-earth element, in the first region R1 may be less than or equal to a concentration of erbium, which is the rare-earth element, in the second region. When the concentration of erbium, which is the rare-earth element, in the first region R1 is set to be less than or equal to the concentration of erbium, which is the rare-earth element, in the second region, the signal in the first region R1 is amplified, and thus increases in noise figure in a final output can be suppressed.

Further, the concentration of erbium, which is the rare-earth element, in the first region R1 may be 10% or less the concentration of erbium, which is the rare-earth element, in the second region. When the concentration of erbium, which is the rare-earth element, in the first region R1 is set to be 20% or less, more preferably 10% or less, of the concentration of erbium, which is the rare-earth element, in the second region, the influence of the first region R1 can be suppressed.

Hereinafter, the second rare-earth element doped optical fiber in the optical fiber amplifier according to the first embodiment will be described. The second rare-earth element doped optical fiber includes a fourth region with a center of a core for guiding the signal light, a fifth region that surrounds the fourth region, and a sixth region that surrounds the fifth region. In the second rare-earth element doped optical fiber, the fourth region is doped with a rare-earth element. Both the fourth region and the fifth region may be doped with the rare-earth element.

Figure 3:
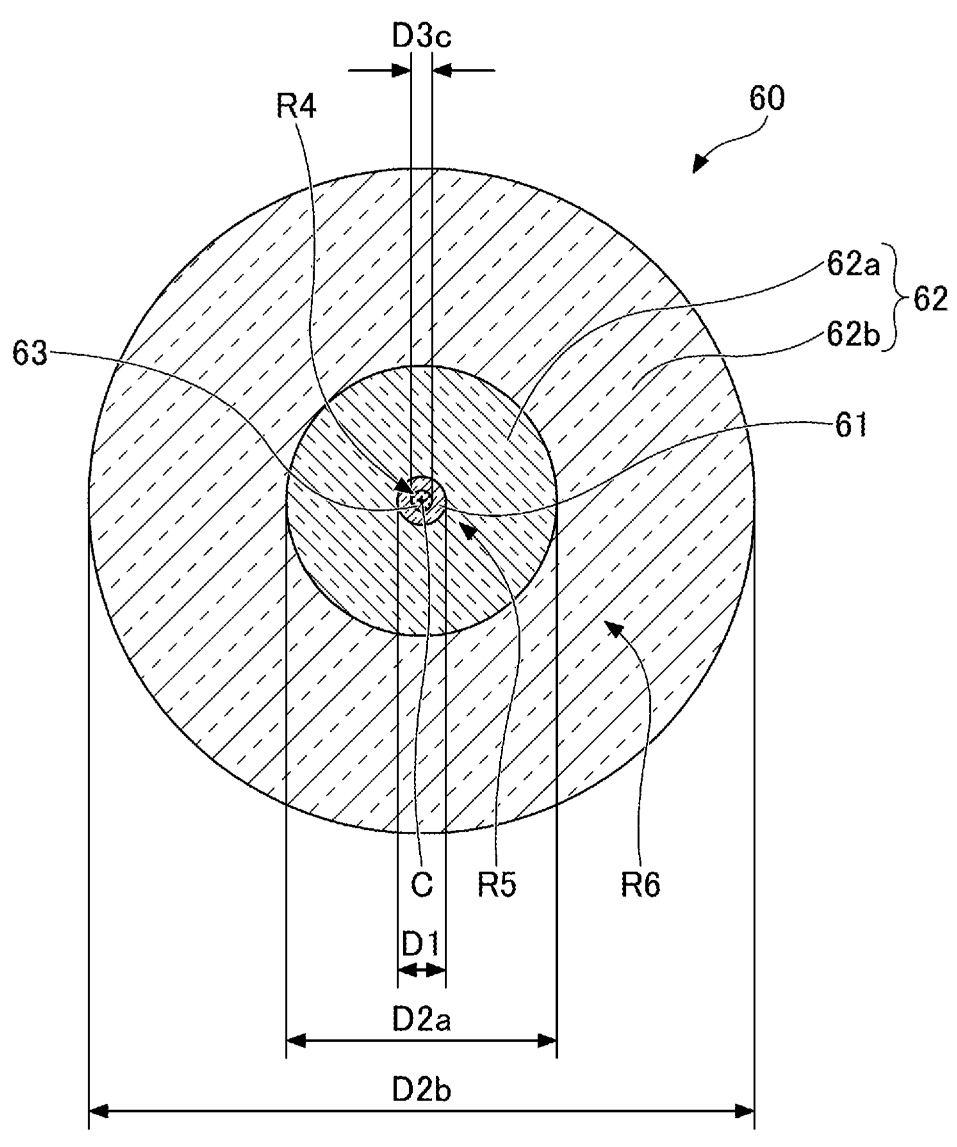
FIG. 3 is a cross-sectional view of a schematic structure of a second rare-earth element doped optical fiber in the optical fiber amplifier according to the first embodiment.

The second rare-earth element doped optical fiber in the optical fiber amplifier according to the first embodiment will be described below using a specific example. FIG. 3 is a diagram showing a schematic structure of the EDF 60 in the optical fiber amplifier 1 as an example of the optical fiber amplifier according to the first embodiment. FIG. 3 is a cross-sectional view of the EDF 60 taken along a plane perpendicular to the longitudinal direction of the EDF 60.

The EDF 60 includes a core 61 and a cladding 62. The cladding 62 includes a first cladding 62*a* and a second cladding 62*b*. The EDF 60 has a waveguide structure that is used for the signal light Ls and that is constituted by the core 61 and the first cladding 62*a*. The EDF 60 also has a waveguide structure that is used for the pump light Le and is constituted by the first cladding 62*a* and the second cladding 62*b*. In the EDF 60, a circular region of the core 61 whose center coincides with the center of the core 61 is doped with erbium. In FIG. 3, an erbium doped region 63 in which the circular region is doped with erbium is indicated by a dotted pattern.

An EDF including a circular region doped with erbium, such as the EDF 60, may be referred to as an optical fiber with an erbium doped circular region.

The core 61 is formed of silica glass co-doped with germanium and aluminum. In the core 61, by co-doping the silica glass with the germanium and the aluminum, a refractive index of the core 61 is 0.9% greater than that of pure silica glass. A diameter D1 of the core 61 is, for example, 8.9 μm.

The first cladding 62*a* is formed of silica glass doped with aluminum. In the first cladding 62*a*, by doping the silica glass with aluminum, a refraction index of the first cladding 62*a* is 0.5% greater than that of pure silica glass. A diameter D2*a* of the first cladding 62*a* is, for example, 50 μm.

The second cladding 62*b* is formed of silica glass doped with fluorine. In the second cladding 62*b*, by doping the silica glass with fluorine, a refraction index of the second cladding 62*b* is 0.7% less than that of pure silica glass. A diameter D2*b* of the second cladding 62*b* is, for example, 125 μm.

A diameter D3*c* of the erbium doped region 63 in which the core 61 is doped with erbium is, for example, 3.4 μm. In the erbium doped region 63, the core 61 is doped with erbium having an atomic concentration of about 5×1024 $m^{-3}$.

When the diameter D1 of the core 61 is used as a reference, the diameter D3*c* of the erbium doped region 63 is, for example, greater than or equal to 0.2×D1 and less than or equal to 1.0×D1, preferably greater than or equal to 0.4×D1 and less than or equal to 0.6×D1.

In the EDF 60, the erbium doped region 63 is referred to as a fourth region R4. A region that is disposed outside the erbium doped region 63 and inside the second cladding 62*b* is referred to as a fifth region R5. Further, a region of the second cladding 62*b* is referred to as a sixth region R6.

In the optical fiber amplifier 1, the first region R1 is a circular region centered around the center C of the core 51. When the circular region is centered around the center of a given core, it is not limited to a case where the center of the circular region exactly coincides with the center of the given core. For example, even when a center position of the circular region and a center position of the core do not coincide with each other, a case where the above two center positions are within the range of a stated manufacturing tolerance means the case where the circular region is centered around the center of the core. In other words, a case where the center of the circular region is situated in proximity to the center of the core also means the case where the circular region is centered around the center of the core. In the optical fiber amplifier 1, the fourth region R4 is a circular region centered around the center C of the core 61.

The first region R1 and the fourth region R4 are concentric with each of the core 51 and the core 61. When the first region R1 and the fourth region R4 are concentric with each of the core 51 and the core 61, the light can be uniformly amplified.

Further, a radius (inner diameter D3*a*/2) of the first region R1 is greater than a radius (diameter D3*c*/2) of the fourth region R4. When the radius (inner diameter D3*a*/2) of the first region R1 is set to be greater than the radius (diameter D3*c*/2) of the fourth region R4, a size of the region where the light is amplified in the first rare-earth element doped optical fiber can be set to be different from a size of the region where the light is amplified in the second rare-earth element doped optical fiber.

In the example described above, the fourth region R4 is doped with the rare-earth element, but the fifth region R5 may be doped with the rare-earth element together with the fourth region R4. For example, a concentration of erbium, which is a rare-earth element, in the fifth region R5 may be less than or equal to a concentration of erbium, which is the rare-earth element, in the fourth region R4. When the concentration of erbium, which is the rare-earth element, in the fifth region R5 is set to be less than or equal to the concentration of erbium, which is the rare-earth element, in the fourth region R4, an amplification factor can be increased in the erbium doped region.

Further, the concentration of erbium, which is the rare-earth element, in the fifth region R5 may be 20% or less, preferably 10% or less, of the concentration of erbium, which is the rare-earth element, in the fourth region R4. When the concentration of erbium, which is a rare-earth element, in the fifth region R5 is set to be 10% or less the concentration of erbium, which is the rare-earth element, in the fourth region R4, the influence of the fifth region R5 can be suppressed.

<Evaluation Result>

Figure 4:
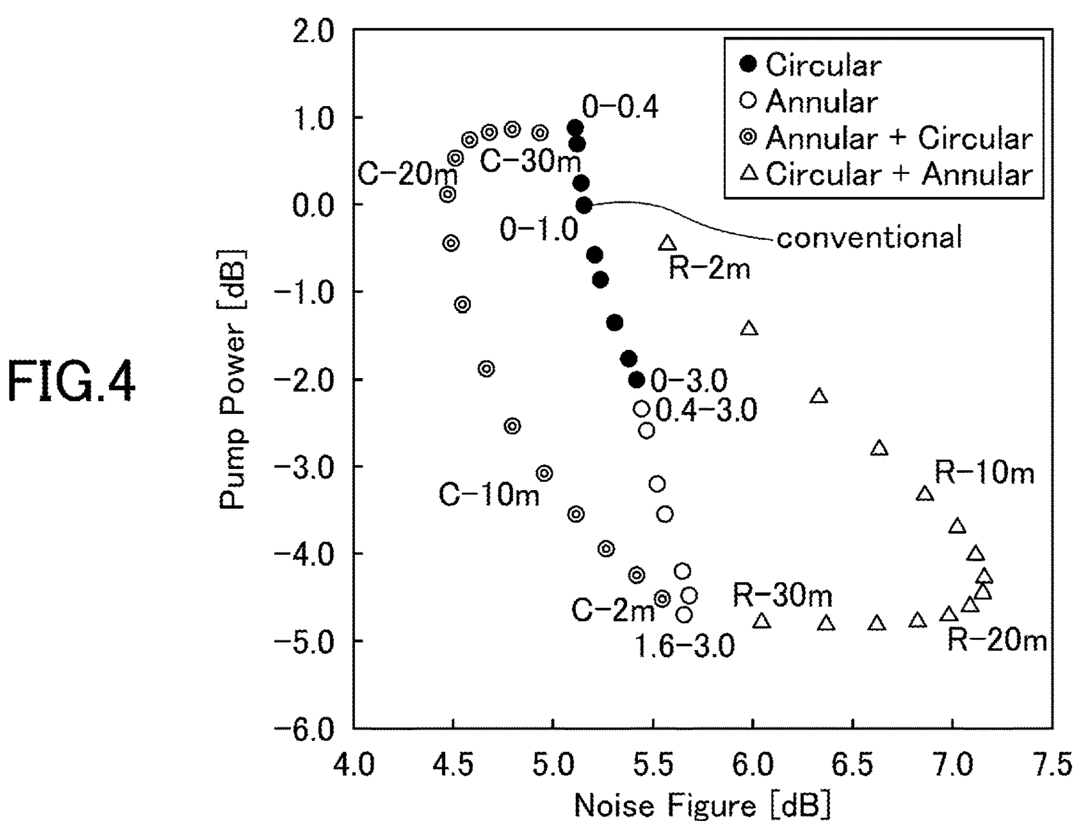
FIG. 4 is a diagram for describing an operation result of the optical fiber amplifier according to the first embodiment.

FIG. 4 shows the simulation result of the relationship between noise figure and optical pump power, with respect to (i) EDFs having different erbium doped region shapes and (ii) EDFs combining these different erbium doped region shapes. In FIG. 4, the horizontal axis represents the noise figure, and the vertical axis represents the optical pump power. The relationship between the noise figure and the optical pump power is indicated by black circles ("●"), where the relationship is obtained when a circular region whose center corresponds to a core center is doped with erbium, and a diameter of the doped circular region is changed from 0.4 times to 3.0 times a core diameter. Also, the relationship between the noise figure and the optical pump power is indicated by white circles ("○"), where the relationship is obtained when an annular region whose center corresponds to the core center is doped with erbium under a condition in which (i) an outer diameter of the doped annular region is constantly 3.0 times the core diameter and (ii) an inner diameter of the doped annular region is changed from 0.4 times to 1.6 times the core diameter.

The relationship between the noise figure and the optical pump power is indicated by double circles ("◎"), where an optical fiber with an erbium doped annular region (whose inner diameter is 1.6 times a core diameter and outer diameter is 3.0 times the core diameter) is connected to an input side, and an optical fiber with an erbium doped circular region (whose diameter is 0.4 times the core diameter) is connected to an output side. In this arrangement, the relationship indicated by the double circles is obtained by optimizing a length of the optical fiber with the erbium doped annular region under a condition in which a length of the optical fiber with the erbium doped circular region changes from 2 m to 30 m. Further, the relationship between the noise figure and the optical pump power is indicated by triangles ("Δ"), where an optical fiber with an erbium doped circular region (whose diameter is 0.4 times the core diameter) is connected to an input side, and an optical fiber with an erbium doped annular region (whose inner diameter is 1.6 times the core diameter and outer diameter is 3.0 times the core diameter) is connected to an output side. In this arrangement, the relationship indicated by the triangles is obtained by optimizing a length of the optical fiber with the erbium doped circular region under a condition in which a length of the optical fiber with the erbium doped annular region changes from 2 m to 30 m.

From the result shown in FIG. 4, it has been seen that there is a trade-off between the noise figure and the optical pump power in both a case of using the optical fiber with the erbium doped circular region alone ("●") and a case of using the optical fiber with the erbium doped annular region alone ("○"). On the other hand, under a condition ("◎") in which the optical fiber with the erbium doped annular region is connected to the input side, and the optical fiber with the erbium doped circular region is connected to the output side, there is a trade-off between the noise figure and the optical pump power. However, in comparison to the case of using the above optical fiber alone, a condition in which both the noise figure and the optical pump power are improved is satisfied. Note that under a condition in which the optical fiber with the doped circular region is connected to the input side, and the optical fiber with the doped annular region is connected to the output side, the optical pump power is improved, but the noise figure is greatly deteriorated.

Figure 5:
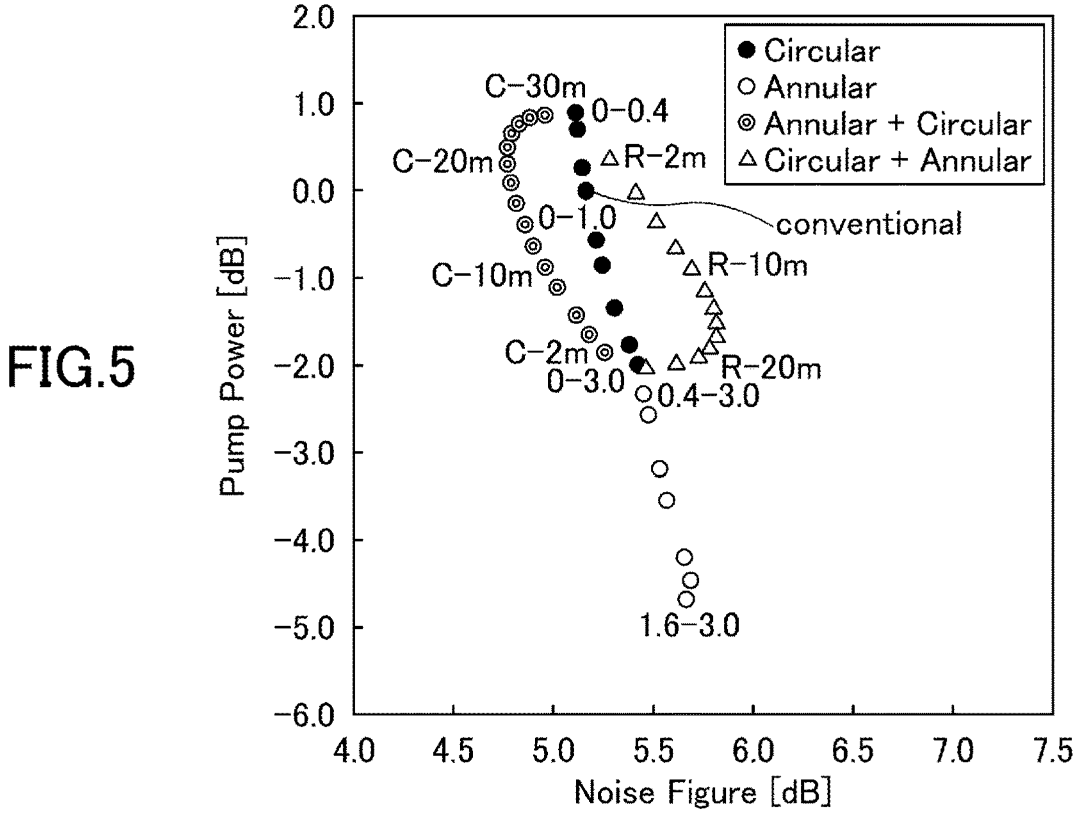
FIG. 5 is a diagram for describing the operation result of the optical fiber amplifier according to the first embodiment.

FIG. 5 shows the simulation result of the relationship between the noise figure and the optical pump power, with respect to (i) EDFs each having a different erbium doped region shape in a cross-section perpendicular to the longitudinal direction of the EDF and (ii) EDFs combining different erbium doped region shapes. In FIG. 5, the horizontal axis represents the noise figure, and the vertical axis represents the optical pump power. The above relationship between the noise figure and the optical pump power is obtained with regard to the four items below.

(1) The relationship between the noise figure and the optical pump power is indicated by black circles ("●"), where the relationship is obtained when a circular region whose center corresponds to a core center is doped with erbium, and a diameter of the doped circular region is changed from 0.4 times to 3.0 times a core diameter.

(2) The relationship between the noise figure and the optical pump power is indicated by white circles ("○"), where the relationship is obtained when an annular region whose center corresponds to a core center is doped with erbium under a condition in which (i) an outer diameter of the doped annular region is constantly 3.0 times a core diameter and (ii) an inner diameter of the doped annular region is changed from 0.4 times to 1.6 times the core diameter.

(3) The relationship between the noise figure and the optical pump power is indicated by double circles ("◎"), where an optical fiber with an erbium doped annular region (whose inner diameter is 1.0 times a core diameter and outer diameter is 1.2 times the core diameter) is connected to an input side, and an optical fiber with an erbium doped circular region (whose diameter is 0.4 times the core diameter) is connected to an output side. In this arrangement, the relationship indicated by the double circles is obtained by optimizing a length of the optical fiber with the erbium doped annular region under a condition in which a length of the optical fiber with the erbium doped circular region changes from 2 m to 30 m.

(4) The relationship between the noise figure and the optical pump power is indicated by triangles ("Δ"), where an optical fiber with an erbium doped circular region (whose diameter is 0.4 times a core diameter) is connected to an input side, and an optical fiber with an erbium doped annular region (whose inner diameter is 1.0 times the core diameter and outer diameter is 1.2 times the core diameter) is connected to an output side. In this arrangement, the relationship indicated by the triangles is obtained by optimizing a length of the optical fiber with the erbium doped circular region under a condition in which a length of the optical fiber with the erbium doped annular region changes from 2 m to 26 m.

From the result shown in FIG. 5, there is a trade-off between the noise figure and the optical pump power in a case ("◎") where the optical fiber with the doped annular region is connected to the input side and the optical fiber with the doped circular region is connected to the output side. However, in comparison to the case of using the above optical fiber alone, a condition in which both the noise figure and the optical pump power are improved is satisfied.

In the optical fiber amplifier according to the first embodiment, after the signal is amplified by the optical fiber with the doped annular region, the resulting signal is amplified by the optical fiber with the doped circular region. With this arrangement, power efficiency can be increased, and the noise figure can be reduced.

The optical fiber amplifier 1, which is an example of the optical fiber amplifier according to the first embodiment, includes a rare-earth element doped optical fiber in which each optical fiber is doped with erbium as a rare-earth element. However, the rare-earth element used in the rare-earth element doped optical fiber is not limited to the above example. The rare-earth element may include, for example, ytterbium (Yb), neodymium (Nd), or thulium (Tm). These rare-earth elements may be adopted in the following embodiments.

Second Embodiment

Hereinafter, the optical fiber amplifier according to a second embodiment will be described. The optical fiber amplifier according to the second embodiment uses a multicore optical fiber for each of the first rare-earth element doped optical fiber and the second rare-earth-doped optical fiber.

Figure 6:
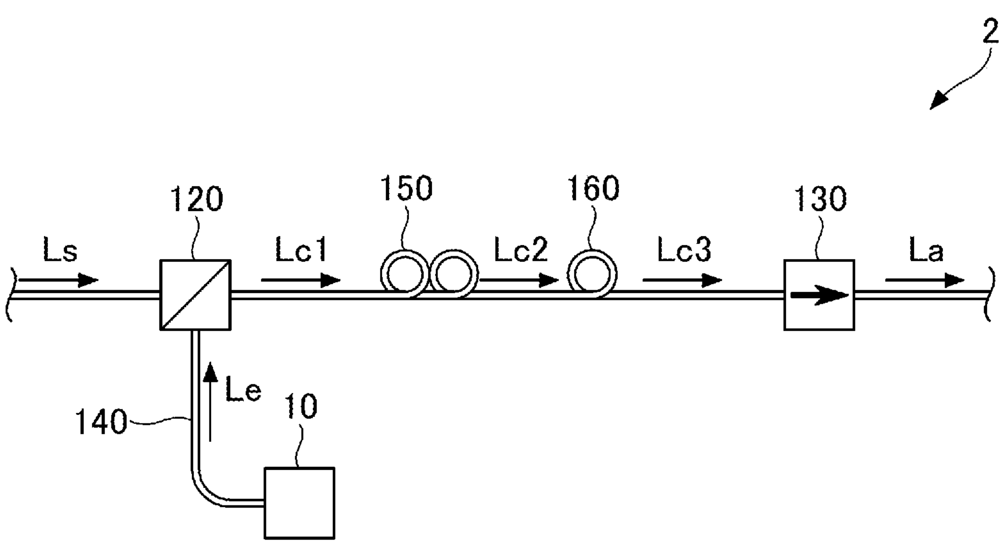
FIG. 6 is a diagram showing the outline of the optical fiber amplifier according to a second embodiment.

The optical fiber amplifier according to the second embodiment will be described below using a specific example. FIG. 6 is a diagram schematically showing an optical fiber amplifier 2 as an example of the optical fiber amplifier according to the second embodiment. The optical fiber amplifier 2 is a four-core optical fiber amplifier. In the optical fiber amplifier 2, an erbium (Er) doped EDF is used as each of the first rare-earth element doped optical fiber and the second rare-earth element doped optical fiber.

The optical fiber amplifier 2 amplifies signal light Ls, and outputs the amplified signal light Ls as signal light La. The optical fiber amplifier 2 includes the pump light source 10, an optical combiner 120, an optical isolator 130, an EDF 150, and an EDF 160. The EDF 150 and the EDF 160 are provided between the optical combiner 120 and the optical isolator 130. The EDF 160 is provided on an output side of the EDF 150.

The signal light Ls to be amplified by the optical fiber amplifier 2 is input to the optical combiner 120. The pump light source 10 is connected to the optical combiner 120 via a pump delivery fiber 140. The pump light Le output from the pump light source 10 is combined with the signal light Ls in the optical combiner 120. The optical combiner 120 outputs combined light Lc1 that is obtained by combining the signal light Ls and the pump light Le, to the EDF 150. The EDF 150 amplifies the signal light Ls included in the input combined light Lc1. Then, the EDF 150 outputs combined light Lc2 to the EDF 160. The EDF 160 amplifies the signal light Ls included in the input combined light Lc2. Then, the EDF 160 outputs combined light Lc3 to the optical isolator 130. The combined light Lc3 passing through the optical isolator 130 is output as signal light La.

Hereinafter, the first rare-earth element doped optical fiber in the optical fiber amplifier according to the second embodiment will be described. The first rare-earth element doped optical fiber includes first regions each including the center of a corresponding core for guiding the signal light, a second region that surrounds the first regions, and a third region that surrounds the second region. In the first rare-earth element doped optical fiber, the second region is doped with a rare-earth element. Both the first region and the second region may be doped with the rare-earth element.

Figure 7:
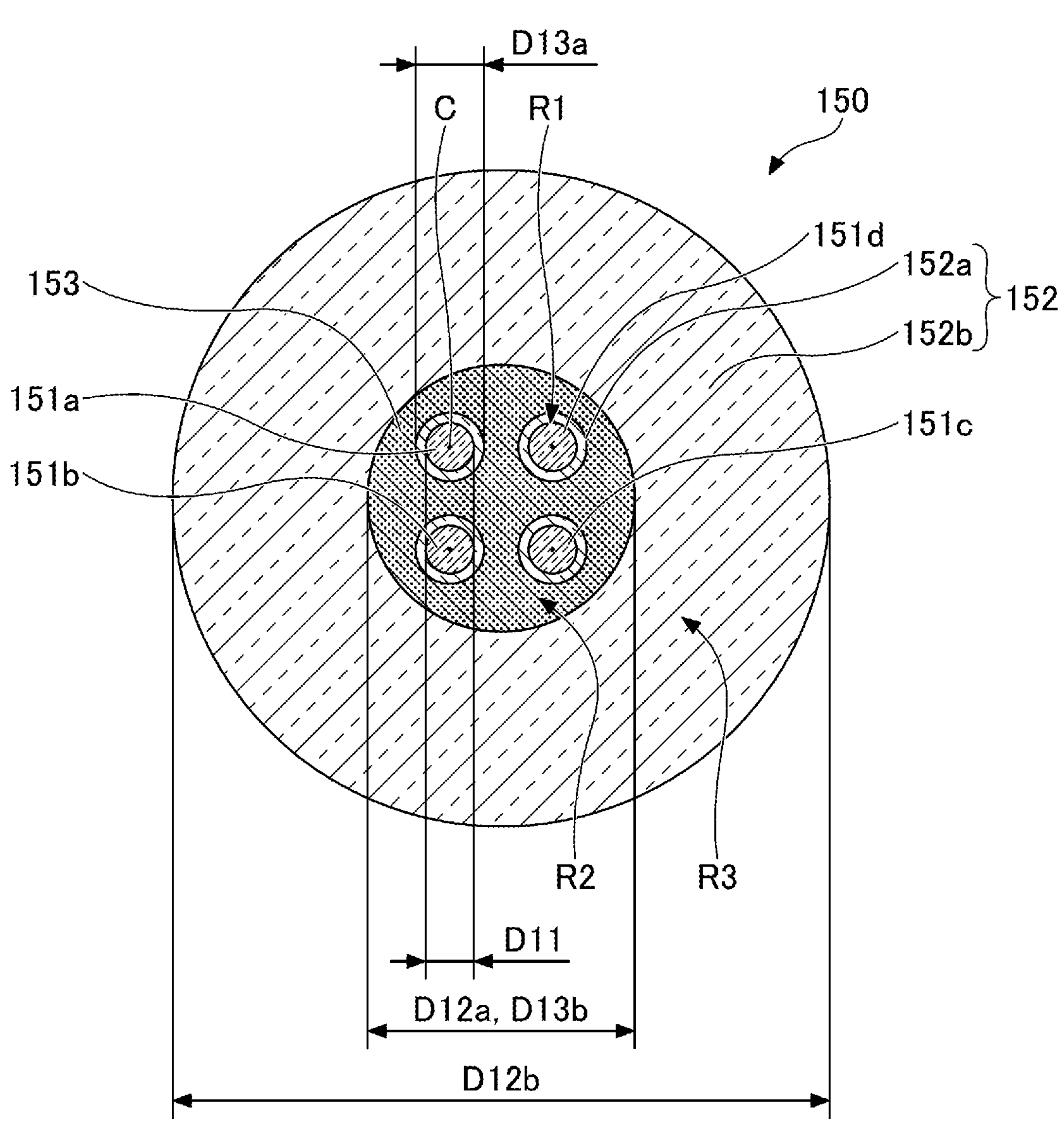
FIG. 7 is a cross-sectional view of a schematic structure of the first rare-earth element doped optical fiber in the optical fiber amplifier according to the second embodiment.

The first rare-earth element doped optical fiber in the optical fiber amplifier according to the second embodiment will be described below using a specific example. FIG. 7 is a diagram showing the schematic structure of the EDF 150 in the optical fiber amplifier 2 as an example of the optical fiber amplifier according to the second embodiment. FIG. 7 is a cross-sectional view of the EDF 150 taken along a plane perpendicular to the longitudinal direction of the EDF 150.

The EDF 150 includes a core 151*a*, a core 151*b*, a core 151*c*, a core 151*d*, and a cladding 152. The cladding 152 includes a first cladding 152*a* and a second cladding 152*b*. The EDF 150 has a waveguide structure that is used for the signal light Ls and is constituted by each core of the core 151*a*, the core 151*b*, the core 151*c*, and the core 151*d*, and the first cladding 152*a*. The EFD 150 also has a waveguide structure that is used for the pump light Le and is constituted by the first cladding 152*a* and the second cladding 152*b*. In the EDF 150, the first cladding 152*a* is doped with erbium, except a portion adjacent to each of the core 151*a*, the core 151*b*, the core 151*c*, and the core 151*d*. In FIG. 7, an erbium doped region 153 in which the first cladding 152*a* is doped with erbium is indicated by a dotted pattern.

Each of the core 151*a*, the core 151*b*, the core 151*c*, and the core 151*d* is formed of silica glass co-doped with germanium and aluminum. In each core of the core 151*a*, the core 151*b*, the core 151*c*, and the core 151*d*, by co-doping the silica glass with germanium and aluminum, a refractive index of the core is 0.9% greater than that of pure silica glass. A diameter D11 of each of the core 151*a*, the core 151*b*, the core 151*c*, and the core 151*d* is, for example, 8.9 μm.

The core 151*a*, the core 151*b*, the core 151*c*, and the core 151*d* are arranged in a square grid in which adjacent cores among the cores 151*a*, 151*b*, 151*c*, and 151*d* are separated, for example, by 25 μm.

The first cladding 152*a* is formed of silica glass doped with aluminum. In the first cladding 152*a*, by doping the silica glass with aluminum, a refraction index of the first cladding 152*a* is 0.5% greater than that of pure silica glass. A diameter D12*a* of the first cladding 152*a* is, for example, 50 μm.

The second cladding 152*b* is formed of silica glass doped with fluorine. In the second cladding 152*b*, by doping the silica glass with fluorine, a refraction index of the second cladding 152*b* is 0.7% less than that of pure silica glass. A diameter D12*b* of the second cladding 152*b* is, for example, 125 μm.

The erbium doped region 153 in which the first cladding 152*a* is doped with erbium is formed in the first cladding 152*a* except a portion of an outer region of each of the core 151*a*, the core 151*b*, the core 151*c*, and the core 151*d*. The erbium doped region 153 is provided outside each of the core 151*a*, the core 151*b*, the core 151*c*, and the core 151*d*, and the erbium doped region 153 is away from a center C of each of the core 151*a*, the core 151*b*, the core 151*c*, and the core 151*d*, by half of the inner diameter D13*a*. An outer diameter D13*b* of the erbium doped region 153 is equal to the diameter D12*a* of the first cladding 152*a*. An outer diameter D13*b* of the erbium doped region 153 is, for example, 50 μm. In the erbium doped region 153, the first cladding 152*a* is doped with erbium having an atomic concentration of about $5\times10^{24}$ $m^{-3}$.

When the diameter D11 of the core 151*a* or the like is used as a reference, the inner diameter D13*a* of the erbium doped region 153 is greater than or equal to 0.4×D11 and less than or equal to 1.8×D11, preferably greater than or equal to 0.8×D11 and less than or equal to 1.4×D11. Also, when the diameter D11 of the core 151*a* or the like is used as the reference, the outer diameter D13*b* of the erbium doped region 153 is greater than or equal to 0.8×D11 and less than or equal to 5.0×D11, preferably greater than or equal to 1.0×D11 and less than or equal to 2.0×D11. If a distance from the center of the core 151*a* or the like is three times or more a radius (half the diameter D11), an optical electric field of the signal light becomes very weak. In view of the above situation, the erbium doped region may be formed within the range of distances that is three times or less the radius (half the diameter D11) from the center of the core 151*a* or the like.

In the EDF 150, each given region that is inward from the erbium doped annular region 153 is referred to as a first region R1. The erbium doped region 153 is referred to as a second region R2. Further, a region outward from the erbium doped region 153 is referred to as a third region R3.

Hereinafter, the second rare-earth element doped optical fiber in the optical fiber amplifier according to the second embodiment will be described. The second rare-earth element doped optical fiber includes fourth regions each including the center of a corresponding core for guiding the signal light, a fifth region that surrounds the fourth regions, and a sixth region that surrounds the fifth region. In the second rare-earth element doped optical fiber, each of the fourth regions is doped with a rare-earth element. The fourth regions and the fifth region may be doped with the rare-earth element.

Figure 8:
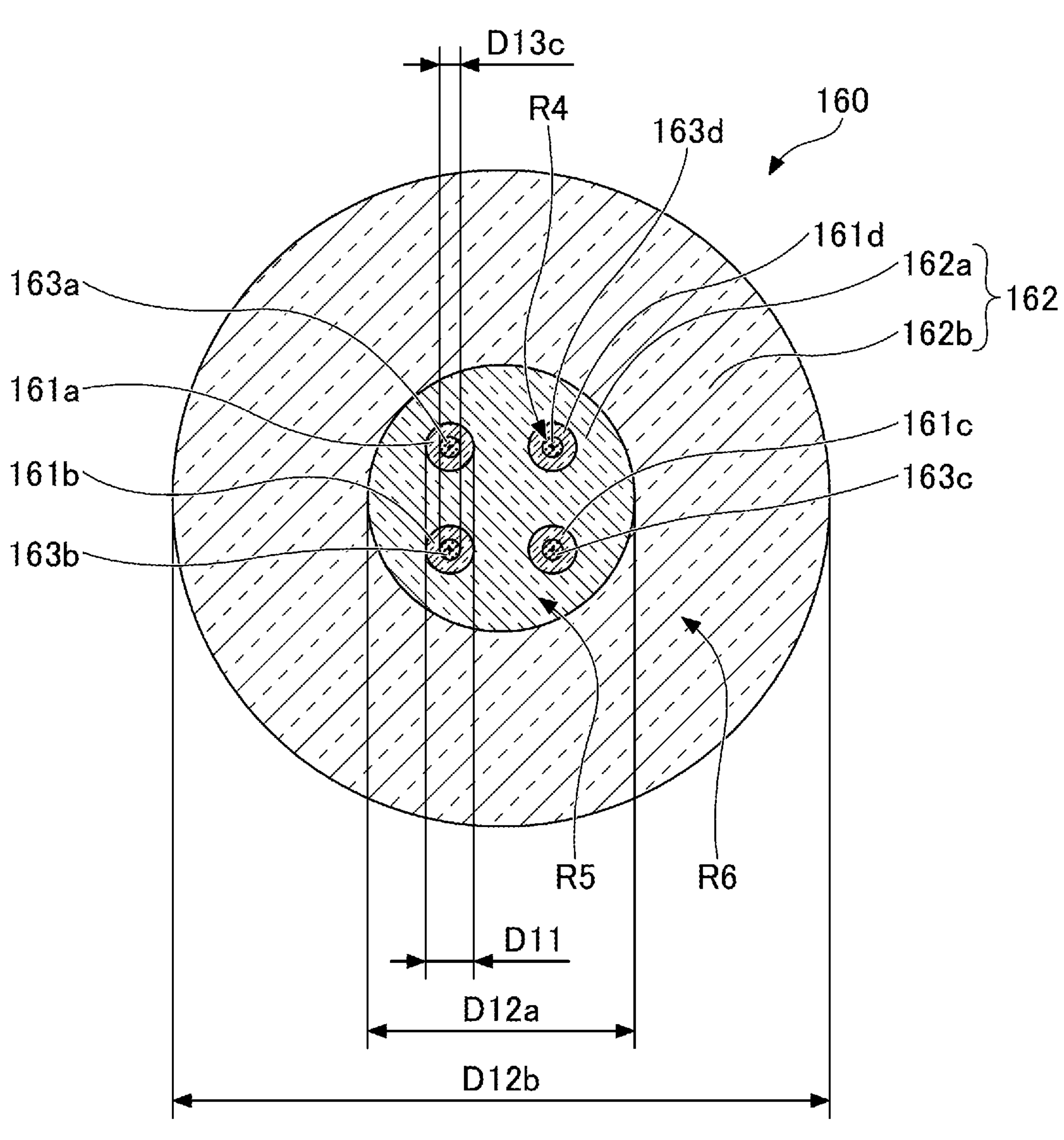
FIG. 8 is a cross-sectional view of a schematic structure of the second rare-earth element doped optical fiber in the optical fiber amplifier according to the second embodiment.

The second rare-earth element doped optical fiber in the optical fiber amplifier according to the second embodiment will be described below using a specific example. FIG. 8 is a diagram showing the schematic structure of the EDF 160 in the optical fiber amplifier 2 as an example of the optical fiber amplifier according to the second embodiment. FIG. 8 is a cross-sectional view of the EDF 160 taken along a plane perpendicular to the longitudinal direction of the EDF 160.

The EDF 160 includes a core 161*a*, a core 161*b*, a core 161*c*, a core 161*d*, and a cladding 162. The cladding 162 includes a first cladding 162*a* and a second cladding 162*b*. The EDF 160 has a waveguide structure that is used for the signal light Ls and is constituted by each core of the core 161*a*, the core 161*b*, the core 161*c*, and the core 161*d*, and the first cladding 162*a*. The EDF 160 also has a waveguide structure that is used for the pump light Le and is constituted by the first cladding 162*a* and the second cladding 162*b*. In the EDF 160, in each core of the core 161*a*, the core 161*b*, the core 161*c*, and the core 161*d*, a circular region whose center coincides with the center of the core is doped with erbium. In FIG. 8, an erbium doped region 163*a*, an erbium doped region 163*b*, an erbium doped region 163*c*, and an erbium doped region 163*d*, in each of which the core is doped with erbium, are indicated by dot patterns.

Each of the core 161*a*, the core 161*b*, the core 161*c*, and the core 161*d* is formed of silica glass co-doped with germanium and aluminum. In each core of the core 161*a*, the core 161*b*, the core 161*c*, and the core 161*d*, by co-doping the silica glass with germanium and aluminum, a refractive index of the core is 0.9% greater than that of pure silica glass. The diameter D11 of each of the core 161*a*, the core 161*b*, the core 161*c*, and the core 161*d* is, for example, 8.9 μm.

The core 161*a*, the core 161*b*, the core 161*c*, and the core 161*d* are arranged in a square grid in which adjacent cores among the cores 161*a*, 161*b*, 161*c*, and 161*d* are separated, for example, by 25 μm.

The first cladding 162*a* is formed of silica glass doped with aluminum. In the first cladding 162*a*, by doping the silica glass with aluminum, a refraction index of the first cladding 162*a* is 0.5% greater than that of pure silica glass. A diameter D12*a* of the first cladding 162*a* is, for example, 50 μm.

The second cladding 162*b* is formed of silica glass doped with fluorine. In the second cladding 162*b*, by doping the silica glass with fluorine, a refraction index of the second cladding 162*b* is 0.7% less than that of pure silica glass. A diameter D12*b* of the second cladding 162*b* is, for example, 125 μm.

A diameter D13*c* of each of the erbium doped region 163*a*, the erbium doped region 163*b*, the erbium doped region 163*c*, and the erbium doped region 163*d* is, for example, 3.4 μm. Further, in each of the erbium doped region 163*a*, the erbium doped region 163*b*, the erbium doped region 163*c*, and the erbium doped region 163*d*, the core is doped with erbium having an atomic concentration of about 5×1024 m−3.

When the diameter D11 of the core 161*a* or the like is used as a reference, the diameter D13*c* of the erbium doped region 163*a* or the like is greater than or equal to 0.2×D11 and less than or equal to 1.0×D11, preferably greater than or equal to 0.4×D11 and less than or equal to 0.6×D11.

In the EDF 160, each of the erbium doped region 163*a*, the erbium doped region 163*b*, the erbium doped region 163*c*, and the erbium doped region 163*d* is referred to as a fourth region R4. A region that is outward from the erbium doped region 163*a*, the erbium doped region 163*b*, the erbium doped region 163*c*, and the erbium doped region 163*d*, and that is inward from the second cladding 162*b* is referred to as a fifth region R5. Further, a region of the second cladding 162*b* is referred to as a sixth region R6.

<Modifications>

The optical fiber amplifier according to a modified second embodiment will be described using a modified optical fiber amplifier 2.

The modified optical fiber amplifier 2 includes an EDF 350 instead of the EDF 150 in the optical fiber amplifier 2. In addition, the modified optical fiber amplifier 2 includes an EDF 360 instead of the EDF 160 in the optical fiber amplifier 2.

Figure 9:
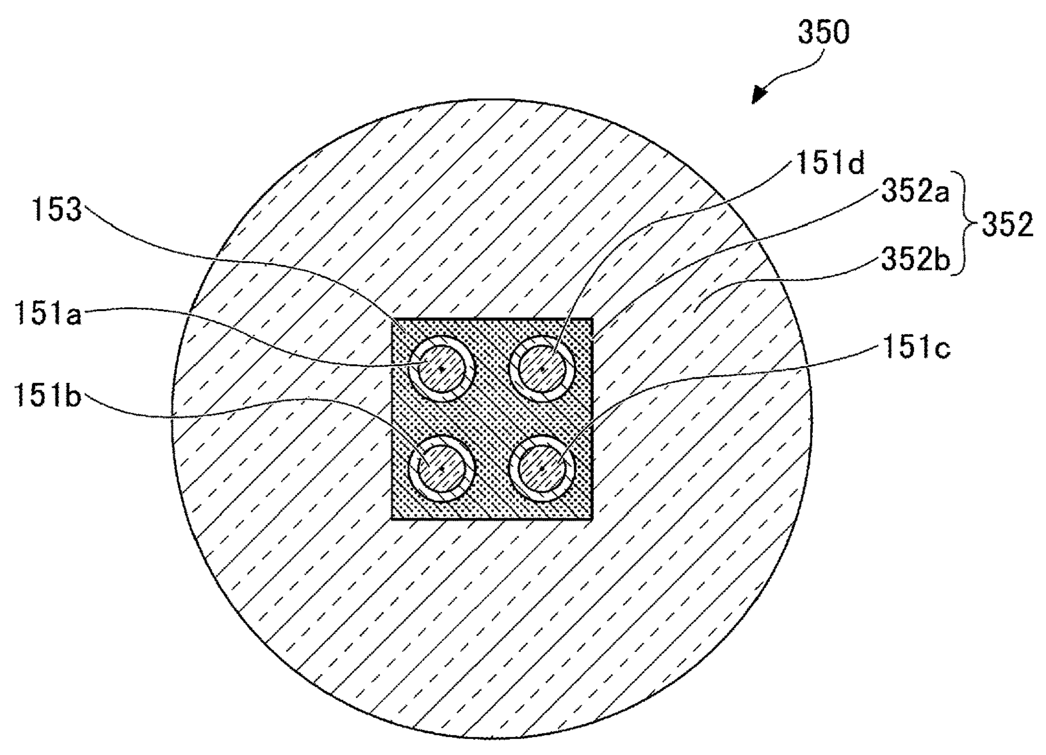
FIG. 9 is a cross-sectional view of a schematic structure of the first rare-earth element doped optical fiber in the optical fiber amplifier according to a modified second embodiment.

Hereinafter, the first rare-earth element doped optical fiber in the optical fiber amplifier according to the modified second embodiment will be described using a specific example. FIG. 9 is a diagram showing a schematic structure of the EDF 350 of the optical fiber amplifier according to the modified second embodiment. FIG. 9 is a cross-sectional view of the EDF 350 taken along a plane perpendicular to the longitudinal direction of the EDF 350.

The EDF 350 includes a core 151*a*, a core 151*b*, a core 151*c*, a core 151*d*, and a cladding 352. The cladding 352 includes a first cladding 352*a* and a second cladding 352*b*. The EDF 350 has a waveguide structure that is used for the signal light Ls and is constituted by each core of the core 151*a*, the core 151*b*, the core 151*c*, and the core 151*d*, and the first cladding 352*a*. The EDF 350 also has a waveguide structure that is used for the pump light Le and is constituted by the first cladding 352*a* and the second cladding 352*b*.

In the EDF 350, the first cladding 352*a* is doped with erbium, except a portion adjacent to each of the core 151*a*, the core 151*b*, the core 151*c*, and the core 151*d*. In FIG. 9, an erbium doped region 153 in which the first cladding 352*a* is doped with the erbium is indicated by a dotted pattern. The first cladding 352*a* has a square shape. Each side of the first cladding 352*a* is, for example, 40 μm in length.

Figure 10:
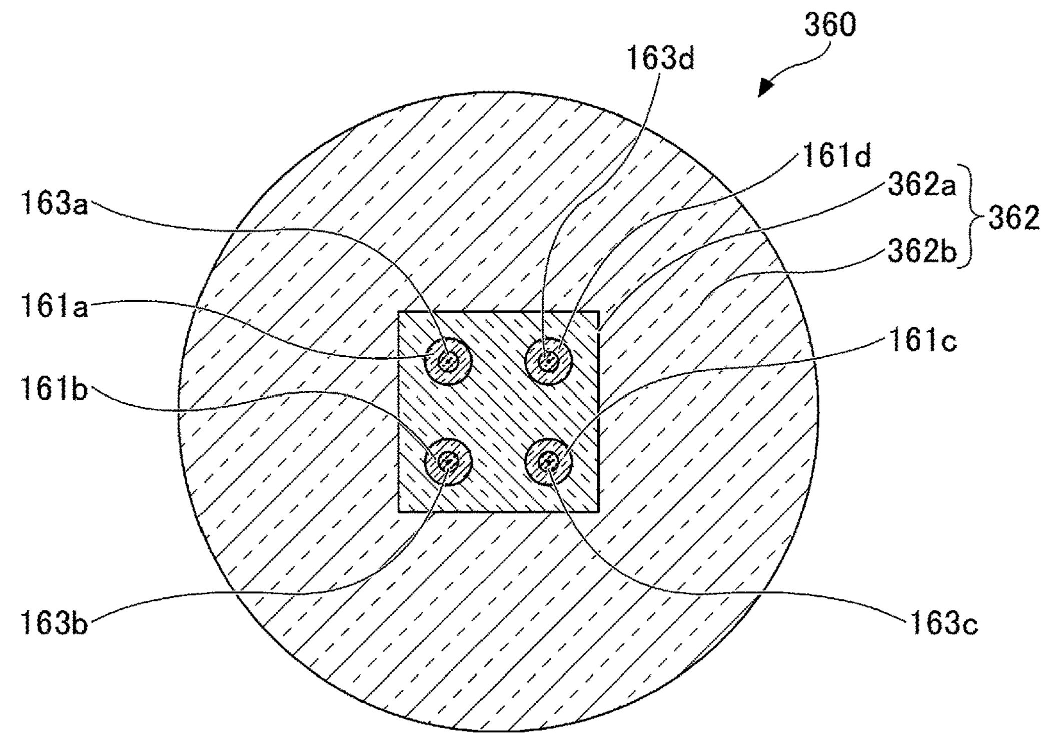
FIG. 10 is a cross-sectional view of a schematic structure of the second rare-earth element doped optical fiber in the optical fiber amplifier according to the modified second embodiment.

The second rare-earth element doped optical fiber in the optical fiber amplifier according to the modified second embodiment will be described below using a specific example. FIG. 10 is a diagram showing a schematic structure of the EDF 360 in the optical fiber amplifier according to the modified second embodiment. FIG. 10 is a cross-sectional view of the EDF 360 taken along a plane perpendicular to the longitudinal direction of the EDF 360.

The EDF 360 includes a core 161*a*, a core 161*b*, a core 161*c*, a core 161*d*, and a cladding 362. The cladding 362 includes a first cladding 362*a* and a second cladding 362*b*. The EDF 360 has a waveguide structure that is used for the signal light Ls and is constituted by each core of the core 161*a*, the core 161*b*, the core 161*c*, and the core 161*d*, and the first cladding 362*a*. The EDF 360 also has a waveguide structure that is used for the pump light Le and is constituted by the first cladding 362*a* and the second cladding 362*b*.

The first cladding 362*a* has a square shape. Each side of the first cladding 362*a* is, for example, 40 μm in length.

Third Embodiment

Hereinafter, the optical fiber amplifier according to a third embodiment will be described. In the optical fiber amplifier according to the third embodiment, a multicore optical fiber is used for each of the first rare-earth element doped optical fiber and the second rare-earth element doped optical fiber.

Figure 11:
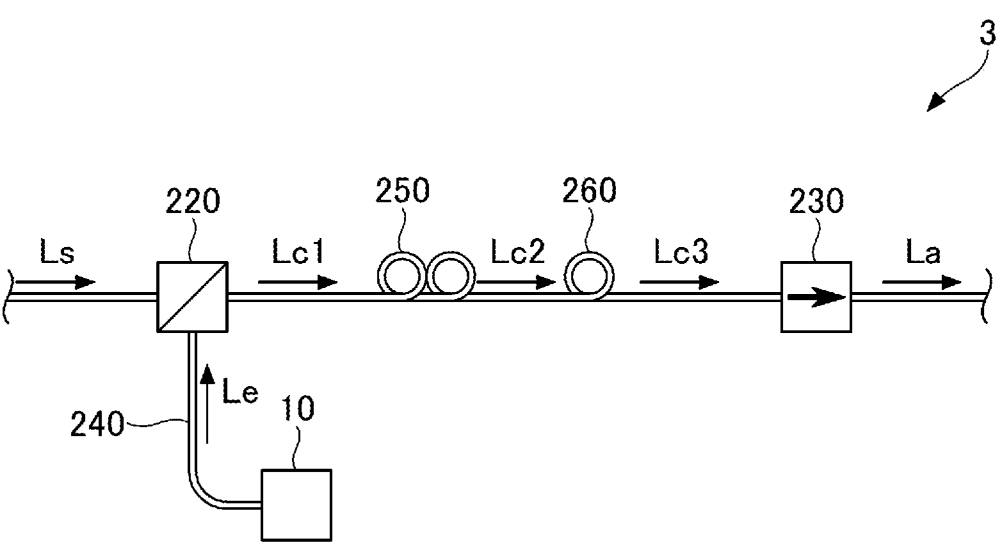
FIG. 11 is a diagram showing the outline of the optical fiber amplifier according to a third embodiment.

The optical fiber amplifier according to the third embodiment will be described below using a specific example. FIG. 11 is a diagram schematically showing an optical fiber amplifier 3 as an example of the optical fiber amplifier according to the third embodiment. The optical fiber amplifier 3 is a seven-core optical fiber amplifier. In the optical fiber amplifier 3, an erbium (Er) doped EDF is used as each of the first rare-earth element doped optical fiber and the second rare-earth element doped optical fiber.

The optical fiber amplifier 3 amplifies the signal light Ls, and outputs the amplified signal light Ls as signal light La. The optical fiber amplifier 3 includes the pump light source 10, an optical combiner 220, an optical isolator 230, an EDF 250, and an EDF 260. The EDF 250 and the EDF 260 are provided between the optical combiner 220 and the optical isolator 230. The EDF 260 is provided on an output side of the EDF 250.

The signal light Ls to be amplified by the optical fiber amplifier 3 is input to the optical combiner 220. The pump light source 10 is connected to the optical combiner 220 via a pump delivery fiber 240. The pump light Le output from the pump light source 10 is combined with the signal light Ls in the optical combiner 220. The optical combiner 220 outputs combined light Lc1 that is obtained by combining the signal light Ls and the pump light Le, to the EDF 250. The EDF 250 amplifies the signal light Ls included in the input combined light Lc1. Then, the EDF 250 outputs combined light Lc2 to the EDF 260. The EDF 260 amplifies the signal light Ls included in the input combined light Lc2. Then, the EDF 260 outputs combined light Lc3 to the optical isolator 230. The combined light Lc3 that passes through the optical isolator 230 is output as signal light La.

Hereinafter, the first rare-earth element doped optical fiber in the optical fiber amplifier according to the third embodiment will be described. The first rare-earth element doped optical fiber includes first regions each including the center of a corresponding core for guiding the signal light, second regions that surround the respective first regions, and a third region that surrounds the second regions. In the first rare-earth element doped optical fiber, each of the second regions is doped with a rare-earth element. The first regions and the second regions may be doped with the rare-earth element. Each core of multiple cores in the first rare-earth element doped optical fiber includes a first region with the center of the core, and includes a second region surrounding the first region. The first rare-earth element doped optical fiber further includes a third region that surrounds all the second regions. In each core of the multiple cores in the first rare-earth element doped optical fiber, the second region is doped with the rare-earth element. The first regions and the second regions may be doped with the rare-earth element.

Figure 12:
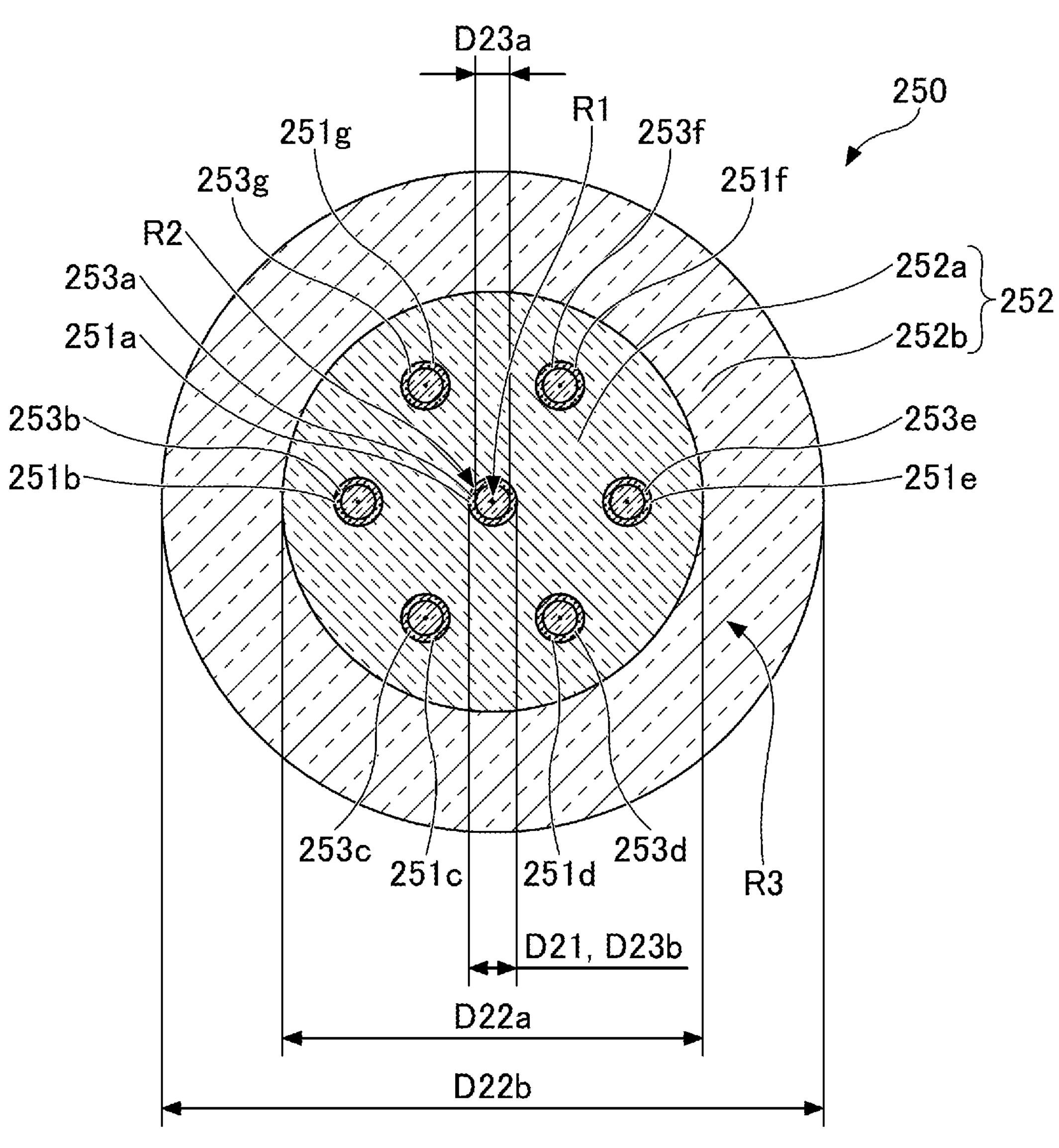
FIG. 12 is a cross-sectional view of a schematic structure of the first rare-earth element doped optical fiber in the optical fiber amplifier according to the third embodiment.

The first rare-earth element doped optical fiber in the optical fiber amplifier according to the third embodiment will be described below using a specific example. FIG. 12 is a diagram showing a schematic structure of the EDF 250 in the optical fiber amplifier 3 as an example of the optical fiber amplifier according to the third embodiment. FIG. 12 is a cross-sectional view of the EDF 250 taken along a plane perpendicular to the longitudinal direction of the EDF 250.

The EDF 250 includes a core 251*a*, a core 251*f*, a core 251*g*, and a cladding 252. In the following description, the core 251*a*, the core 251*b*, the core 251*c*, the core 251*d*, the core 251*e*, the core 251*f*, and the core 251*g* may be referred to as the core 251*a* and the like. The cladding 252 includes a first cladding 252*a* and a second cladding 252*b*. The EDF 250 has a waveguide structure that is used for the signal light Ls and is constituted by each core of the core 251*a* and the like, and the first cladding 252*a*. The EDF 250 also has a waveguide structure that is used for the pump light Le and is constituted by the first cladding 252*a* and the second cladding 252*b*.

The core 251*a* and the like are arranged in a hexagonal close-packed pattern in which adjacent cores among the core 251*a* and the like are separated, for example, by 25 μm.

In the EDF 250, an annular region in the core 251*a* is doped with erbium. The core 251*a* has an erbium doped region 253*a*. Similarly, the core 251*b*, the core 251*c*, the core 251*d*, the core 251*e*, the core 251*f*, and the core 251*g* include an erbium doped region 253*b*, an erbium doped region 253*c*, an erbium doped region 253*d*, an erbium doped region 253*e*, an erbium doped region 253*f*, and an erbium doped region 253*g*, respectively. In FIG. 12, the erbium doped region 253*a* and the like in which the cores are doped with erbium are indicated by dotted patterns.

Each core of the core 251*a* and the like is formed of silica glass co-doped with germanium and aluminum. In each core of the core 251*a* and the like, by co-doping the silica glass with the germanium and the aluminum, a refraction index of the core is 0.9% greater than that of pure silica glass. A diameter D21 of each core of the core 251*a* and the like is, for example, 8.9 μm.

The first cladding 252*a* is formed of silica glass doped with aluminum. In the first cladding 252*a*, by doping the silica glass with the aluminum, a refraction index of the first cladding 252*a* is 0.5% greater than that of pure silica glass. A diameter D22*a* of the first cladding 252*a* is, for example, 80 μm.

The second cladding 252*b* is formed of silica glass doped with fluorine. In the second cladding 252*b*, by doping the silica glass with fluoride, a refraction index of the second cladding 252*b* is 0.7% less than that of pure silica glass. A diameter D22*b* of the second cladding 252*b* is, for example, 125 μm.

In the core 251*a*, an inner diameter D23*a* of the erbium doped region 253*a* is, for example, 7.0 μm. Also, an outer diameter D23*b* of the erbium doped region 253*a* in the core 251*a* is equal to the diameter D21 of the core 251*a*. An outer diameter D23*b* of the erbium doped region 253*a* in the core 251*a* is, for example, 8.9 μm. In the erbium doped region 253*a* in which the core 251*a* is doped with erbium, the core

251*a* is doped with erbium having an atomic concentration of about $4\times10^{24}$ $m^{-3}$. In the other erbium doped regions including the erbium doped region 253*b* and the like, doping is performed as in the erbium doped region 253*a*.

When the diameter D21 of each core of the core 251*a* and the like is used as a reference, the inner diameter D23*a* of each erbium doped region of the erbium doped region 253*a* and the like is greater than or equal to 0.4×D21 and less than or equal to 1.8×D21, preferably greater than or equal to 0.8×D21 and less than or equal to 1.4×D21. Also, when the diameter D21 of each core of the core 251*a* and the like is used as the reference, the outer diameter D23*b* of each erbium doped region of the erbium doped region 253*a* and the like is greater than or equal to 0.8×D21 and less than or equal to 5.0×D21, preferably greater than or equal to 1.0×D21 and less than or equal to 2.0×D21.

In the EDF 250, a region that is inward relative to each annular erbium doped region of the annular erbium doped region 253*a* and the like is referred to as a first region R1. Each annular erbium doped region of the erbium doped region 253*a* and the like is referred to as a second region R2. Further, a region that is outside the erbium doped region 253*a* and the like is referred to as a third region R3.

Hereinafter, the second rare-earth element doped optical fiber in the optical fiber amplifier according to the third embodiment will be described. The second rare-earth element doped optical fiber includes fourth regions each including the center of a corresponding core for guiding the signal light, a fifth region that surrounds the fourth regions, and a sixth region that surrounds the fifth region. In the second rare-earth element doped optical fiber, each of the fourth regions is doped with a rare-earth element. The fourth regions and the fifth region may be doped with the rare-earth element.

Figure 13:
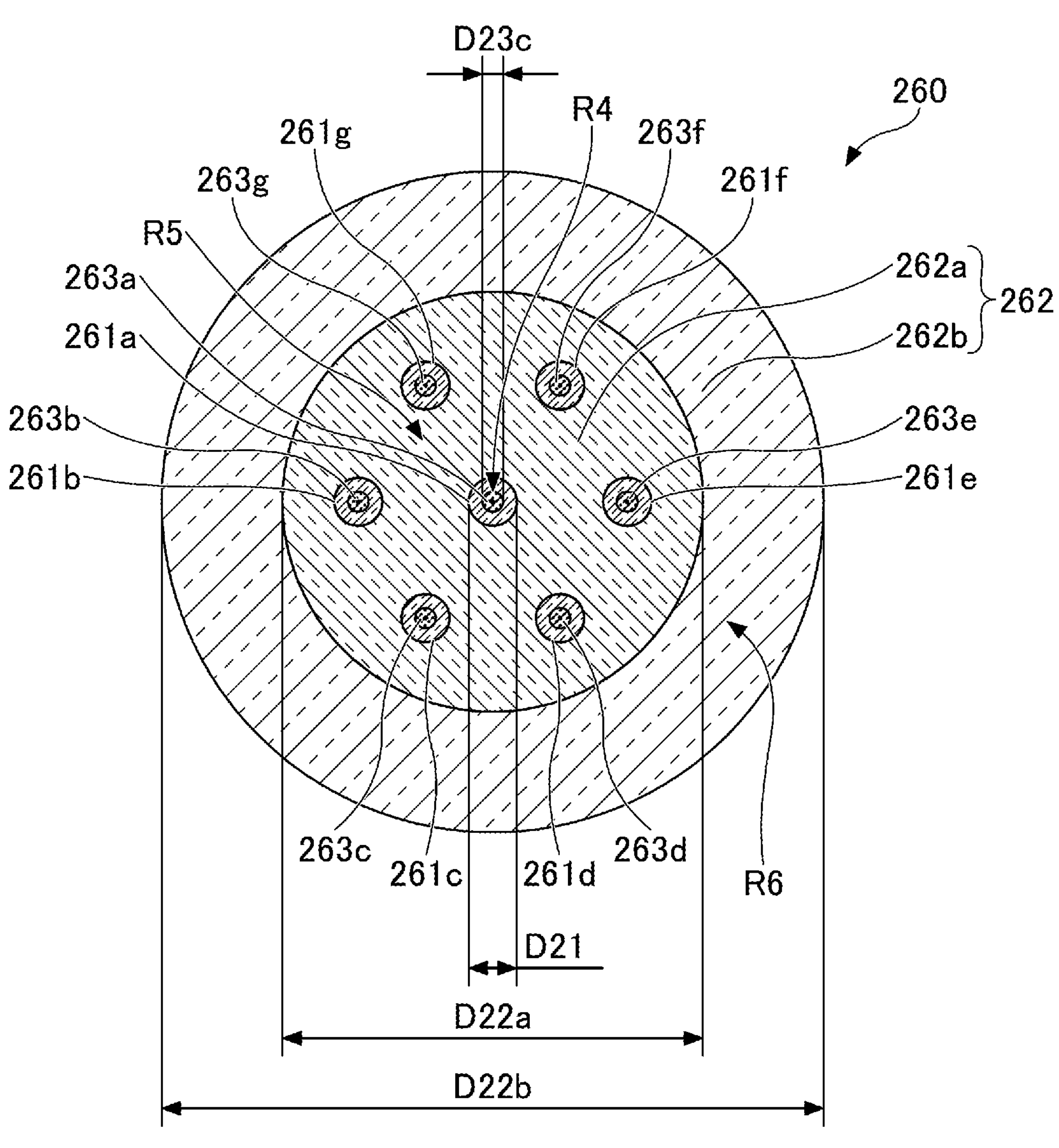
FIG. 13 is a cross-sectional view of a schematic structure of the second rare-earth element doped optical fiber in the optical fiber amplifier according to the third embodiment.

The second rare-earth element doped optical fiber in the optical fiber amplifier according to the third embodiment will be described below using a specific example. FIG. 13 is a diagram showing a schematic structure of the EDF 260 in the optical fiber amplifier 3 as an example of the optical fiber amplifier according to the third embodiment. FIG. 13 is a cross-sectional view of the EDF 260 taken along a plane perpendicular to the longitudinal direction of the EDF 260.

The EDF 260 includes a core 261*a*, a core 261*b*, a core 261*c*, a core 261*d*, a core 261*e*, a core 261*f*, a core 261*g*, and a cladding 262. In the following description, the core 261*a*, the core 261*b*, the core 261*c*, the core 261*d*, the core 261*e*, the core 261*f*, and the core 261*g* may be referred to as the core 261*a* and the like. The cladding 262 includes a first cladding 262*a* and a second cladding 262*b*. The EDF 260 has a waveguide structure that is used for the signal light Ls and is constituted by each core of the core 261*a* and the like, and the first cladding 262*a*. The EDF 260 also has a waveguide structure that is used for the pump light Le and is constituted by the first cladding 262*a* and the second cladding 262*b*.

In the EDF 260, a circular region in the core 261*a* is doped with erbium. The core 261*a* has an erbium doped region 263*a*. Similarly, the core 261*b*, the core 261*c*, the core 261*d*, the core 261*e*, the core 261*f*, and the core 261*g* have an erbium doped region 263*b*, an erbium doped region 263*c*, an erbium doped region 263*d*, an erbium doped region 263*e*, an erbium doped region 263*f*, and an erbium doped region 263*g*, respectively. In FIG. 13, the erbium doped region 263*a* and the like are shown by dotted patterns.

Each core of the core 261*a* and the like is formed of silica glass co-doped with germanium and aluminum. In each core of the core 261*a* and the like, by co-doping the silica glass with germanium and aluminum, a refraction index of the core is 0.9% greater than that of pure silica glass. A diameter D21 of each core of the core 261*a* and the like is, for example, 8.9 μm.

The cores including the core 261*a* and the like are arranged in a hexagonal close-packed pattern in which adjacent cores among the cores are separated, for example, by 25 μm.

The first cladding 262*a* is formed of silica glass doped with aluminum. In the first cladding 262*a*, by doping the silica glass with aluminum, a refraction index of the first cladding 262*a* is 0.5% greater than that of pure silica glass. A diameter D22*a* of the first cladding 262*a* is, for example, 80 μm.

The second cladding 262*b* is formed of silica glass doped with fluorine. In the second cladding 262*b*, by doping the silica glass with fluorine, a refraction index of the second cladding 262*b* is 0.7% less than that of pure silica glass. A diameter D22*b* of the second cladding 262*b* is, for example, 125 μm.

A diameter D23*c* of the erbium doped region 263*a* in which the core 261*a* is doped with erbium is, for example, 3.4 μm. In the erbium doped region 263*a*, the core 261*a* is doped with erbium having an atomic concentration of about $4\times10^{24}$ $m^{-3}$. Doping is performed in the erbium doped region 263*b* and the like, as in the erbium doped region 263*a*.

When the diameter D21 of each core of the core 261*a* and the like is used as a reference, the diameter D23*c* of each erbium doped region of the erbium doped region 263*a* and the like is greater than or equal to 0.2×D21 and less than or equal to 1.0×D21, preferably greater than or equal to 0.4×D21 and less than or equal to 0.6×D21.

In the EDF 260, each erbium doped region of the erbium doped region 263*a* and the like is referred to as a fourth region R4. A region that is outward from the erbium doped region 263*a* and the like and that is inward from the second cladding 262*b* is referred to as a fifth region R5. Further, a region of the second cladding 262*b* is referred to as a sixth region R6.

<Modifications>

Hereinafter, the optical fiber amplifier according to a modified third embodiment will be described using a modified optical fiber amplifier 3.

The modified optical fiber amplifier 3 includes an EDF 450 instead of the EDF 250 in the optical fiber amplifier 3. In addition, the modified optical fiber amplifier 3 includes an EDF 460 instead of the EDF 260 in the optical fiber amplifier 3.

Figure 14:
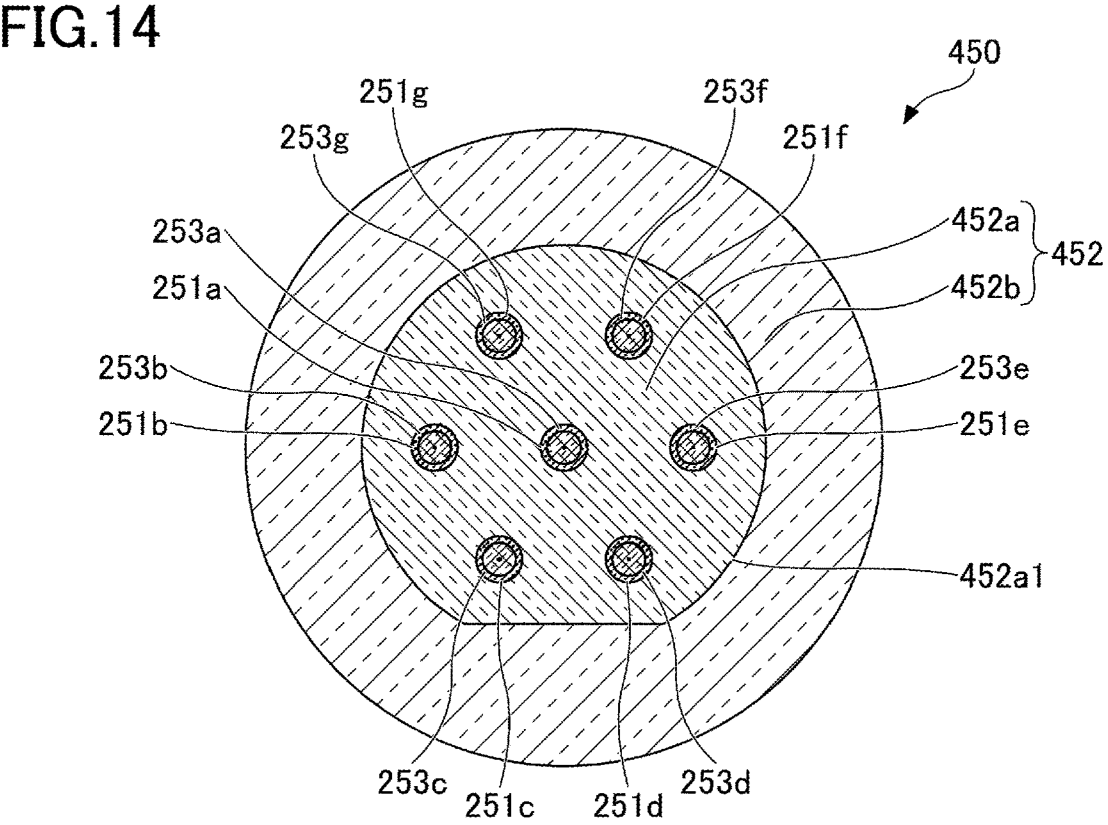
FIG. 14 is a cross-sectional view of a schematic structure of the first rare-earth element doped optical fiber in the optical fiber amplifier according to a modified third embodiment.

The first rare-earth element doped optical fiber in the optical fiber amplifier according to the modified third embodiment will be described below using a specific example. FIG. 14 is a diagram showing a schematic structure of the EDF 450 in the optical fiber amplifier according to the modified third embodiment. FIG. 14 is a cross-sectional view of the EDF 450 taken along a plane perpendicular to the longitudinal direction of the EDF 450.

The EDF 450 includes a core 251*a*, a core 251*b*, a core 251*c*, a core 251*d*, a core 251*e*, a core 251*f*, a core 251*g*, and a cladding 452. The cladding 452 includes a first cladding 452*a* and a second cladding 452*b*. The EDF 450 has a waveguide structure that is used for the signal light Ls and is constituted by each core of the core 251*a* and the like, and the first cladding 452*a*. The EDF 450 also has a waveguide structure that is used for the pump light Le and is constituted by the first cladding 452*a* and the second cladding 452*b*.

The first cladding 452*a* has a cross-sectional shape that is surrounded by an arc (major arc) 452*a*1, having a central angle of greater than 180°, and a chord 452*a*2. A diameter of the arc 452*a*1 is, for example, 80 μm. The chord 452*a*2 is, for example, 40 μm in length.

Figure 15:
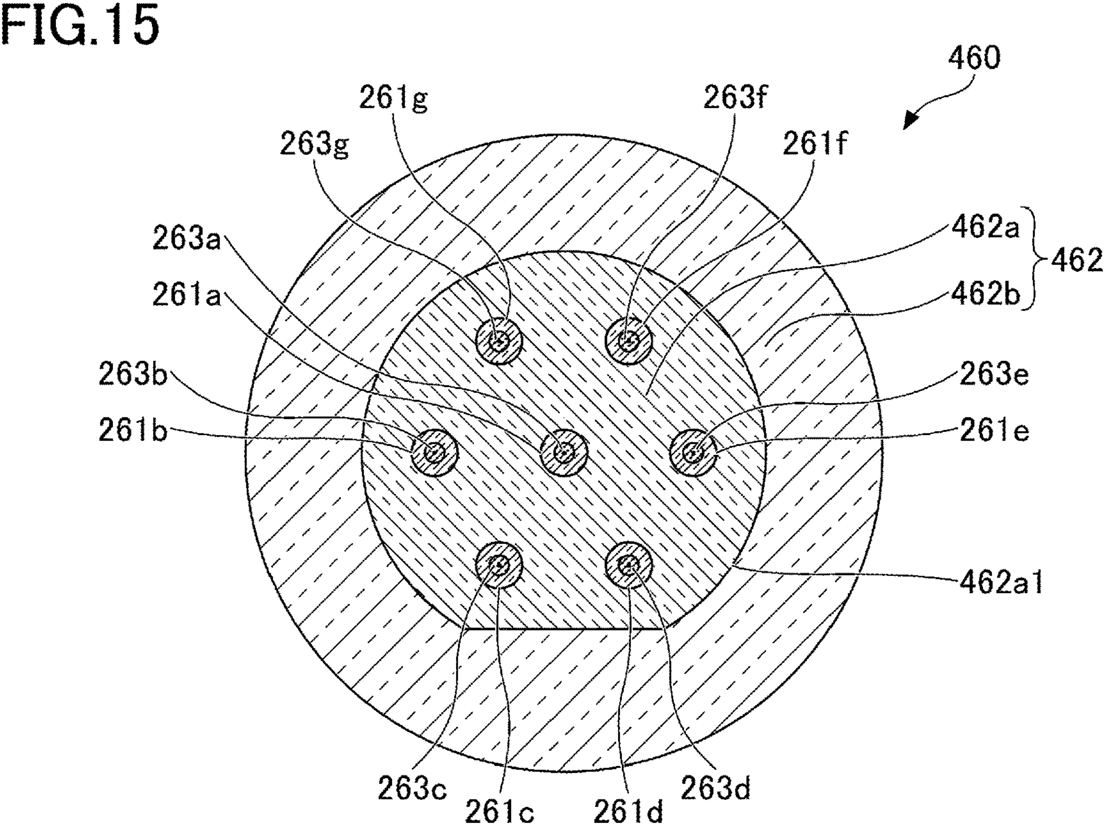
FIG. 15 is a cross-sectional view of a schematic structure of the second rare-earth element doped optical fiber in the optical fiber amplifier according to the modified third embodiment.

The second rare-earth element doped optical fiber in the optical fiber amplifier according to the modified third embodiment will be described below using a specific example. FIG. 15 is a diagram showing a schematic structure of the EDF 460 in the optical fiber amplifier according to the modified third embodiment. FIG. 15 is a cross-sectional view of the EDF 460 taken along a plane perpendicular to the longitudinal direction of the EDF 460.

The EDF 460 includes a core 261*a*, a core 261*b*, a core 261*c*, a core 261*d*, a core 261*e*, a core 261*f*, a core 261*g*, and a cladding 462. The cladding 462 includes a first cladding 462*a* and a second cladding 462*b*. The EDF 460 has a waveguide structure that is used for the signal light Ls and is constituted by each core of the core 261*a* and the like, and the first cladding 462*a*. The EDF 460 also has a waveguide structure that is used for the pump light Le and is constituted by the first cladding 462*a* and the second cladding 462*b*.

The first cladding 462*a* has a cross-sectional shape surrounded by an arc (major arc) 462*a*1, having a center angle of greater than 180°, and a chord 462*a*2. A diameter of the arc 462*a*1 is, for example, 80 μm. The chord 462*a*2 is, for example, 40 μm in length.

The embodiments of the present disclosure are presented for purposes of illustration, and are not intended to be limiting in all respects. Various modifications, omissions, substitutions, and changes in the embodiments are intended to cover the scope of and the equivalent to the present disclosure.

What is claimed is:

1. An optical fiber amplifier comprising:

a first rare-earth element doped optical fiber including
  a first region including a center of a first core configured to guide signal light,
  a second region surrounding the first region and doped with a rare-earth element, and
  a third region surrounding the second region; and
a second rare-earth element doped optical fiber provided on a signal output-side of the first rare-earth element doped optical fiber, the second rare-earth element doped optical fiber including
  a fourth region including a center of a second core configured to guide the signal light, the fourth region being doped with the rare-earth element,
  a fifth region surrounding the fourth region, and
  a sixth region surrounding the fifth region.

2. The optical fiber amplifier according to claim 1, wherein in the first rare-earth element doped optical fiber, a concentration of the rare-earth element in the first region is less than or equal to a concentration of the rare-earth element in the second region.

3. The optical fiber amplifier according to claim 2, wherein in the first rare-earth element doped optical fiber, the concentration of the rare-earth element in the first region is 10% or less the concentration of the rare-earth element in the second region.

4. The optical fiber amplifier according to claim 1, wherein in the second rare-earth element doped optical fiber, a concentration of the rare-earth element in the fifth region is less than or equal to a concentration of the rare-earth element in the fourth region.

5. The optical fiber amplifier according to claim 4, wherein in the second rare-earth element doped optical fiber, the concentration of the rare-earth element in the fifth region is 10% or less the concentration of the rare-earth element in the fourth region.

6. The optical fiber amplifier according to claim 1, wherein the first region in the first rare-earth element doped optical fiber is a circular region centered around the center of the first core included in the first region, wherein the fourth region in the second rare-earth element doped optical fiber is a circular region centered around the center of the second core included in the fourth region, and wherein a diameter of the first region is greater than a diameter of the fourth region.

7. The optical fiber amplifier according to claim 1, wherein each of the first rare-earth element doped optical fiber and the second rare-earth element doped optical fiber satisfies a single mode condition in which the signal light is transmitted in single mode at an operational wavelength.

8. The optical fiber amplifier according to claim 7, wherein the first rare-earth element doped optical fiber has a first mode field diameter at the operational wavelength, and the second rare-earth element doped optical fiber has a second mode field diameter at the operational wavelength, and wherein the first mode field diameter and the second mode field diameter are matched within a relative error range of 15% or less.

9. The optical fiber amplifier according to claim 1, wherein each of the first rare-earth element doped optical fiber and the second rare-earth element doped optical fiber is a multicore optical fiber.

10. A rare-earth element doped multicore optical fiber comprising:

multiple cores each of which is configured to guide signal light, each core of the multiple cores including
  a first region including a center of the core, and
  a second region surrounding the first region; and
a third region surrounding all second regions in the multiple cores,
wherein a concentration of a rare-earth element in the first region is less than a concentration of the rare-earth element in the second region.

11. The rare-earth element doped multicore optical fiber according to claim 10, wherein the concentration of the rare-earth element in the first region is 20% or less the concentration of the rare-earth element in the second region.

12. The optical fiber amplifier according to claim 9, wherein the multicore optical fiber of the first rare-earth element doped optical fiber includes multiple cores each of which is configured to guide signal light, each core of the multiple cores including
  the first region including a center of the core, and
  the second region surrounding the first region; and
the third region surrounding all second regions in the multiple cores,
wherein a concentration of a rare-earth element in the first region is less than a concentration of the rare-earth element in the second region, and
wherein the concentration of the rare-earth element in the first region is 20% or less the concentration of the rare-earth element in the second region.

* * * * *